Oct. 16, 1928.

W. S. LOCKE 1,688,279

LIQUID SUPPLY TANK

Filed Nov. 26, 1927

INVENTOR
W. S. Locke,
BY
ATTORNEY

Patented Oct. 16, 1928.

1,688,279

UNITED STATES PATENT OFFICE.

WILLIAM S. LOCKE, OF PORTLAND, OREGON, ASSIGNOR OF ONE-HALF TO PORTLAND REALTY AND TRUST CO., OF PORTLAND, OREGON, A CORPORATION OF OREGON.

LIQUID-SUPPLY TANK.

Application filed November 26, 1927. Serial No. 235,965.

My invention relates to automatic tanks and more particularly to liquid supply tanks.

An object of the invention is to provide a liquid supply tank wherein liquid under pressure is supplied to one reservoir and subsequently admitted to a second reservoir, the supply to the second reservoir being automatically controlled by the liquid volume in the latter.

Further the invention provides a liquid supply tank having an improved float valve for controlling the supply of liquid from one reservoir to the other so that a predetermined volume of liquid will be at all times contained in both reservoirs.

With the preceding and other objects and advantages in mind, the invention consist in the novel combination of elements, constructions and arrangement of parts to be hereinafter specifically referred to, claimed and illustrated in the accompanying drawings, wherein:

Referring to the invention in detail a main liquid supply tank or reservoir 5 of rectangular configuration, having an outlet pipe 6 leading from one end thereof adjacent its bottom, is provided.

Figure 1:
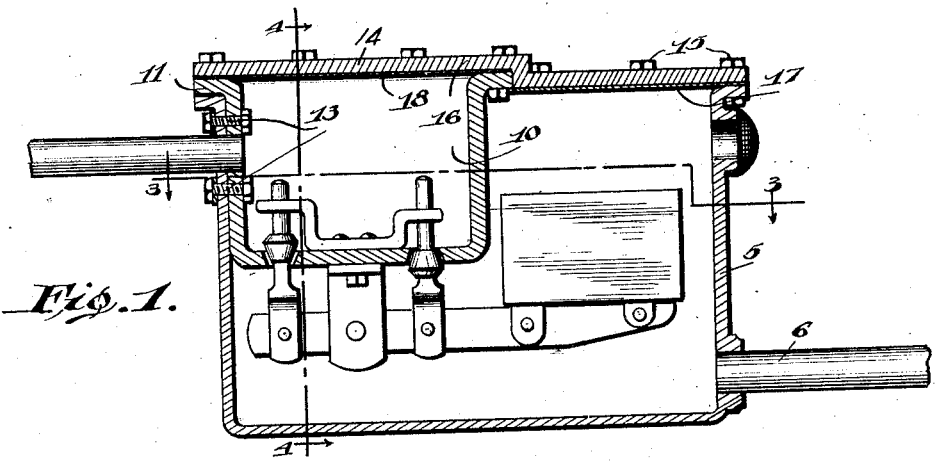
Figure 1 is a vertical sectional view of the invention and illustrating the valves in open position.
Figure 2:
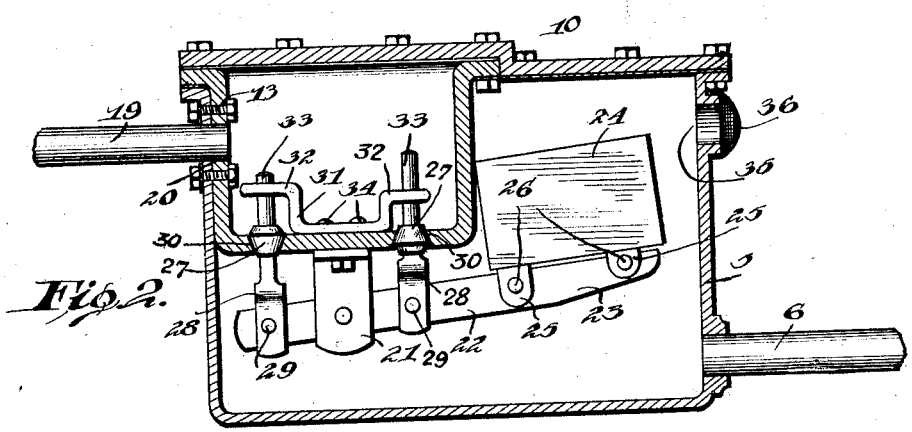
Figure 2 is a similar view illustrating the valves in closed position.
Figures 3, 4:
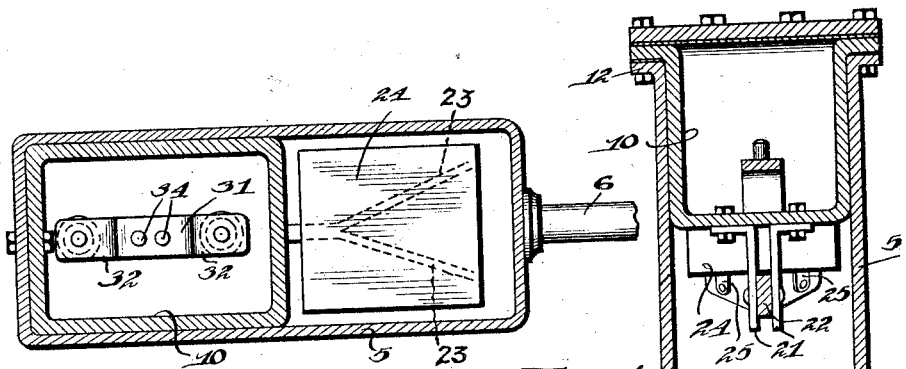
Figure 3 is a horizontal section on line 3—3 of Figure 1.
Figure 4 is a vertical section on line 4—4 of Figure 1.

A high pressure rectangular tank or reservoir 10 is arranged within the main tank 5 and is provided with a lateral marginal flange 11 which rests upon a similar marginal flange 12 formed on the upper edge of the tank 5 to support the tank 10 therein. As illustrated in Figure 3, the tank 10 is of the same cross sectional contour as the tank 5 and is snugly received by the walls of the latter and as illustrated in Figure 1 one of the end walls of the tank 10 is detachably connected with the adjacent end wall of the tank 5 by removable fastenings 13.

A common cover plate 14 is provided for the upper end of both tanks and is detachably held on the flange 12 by removable fastenings 15. From a point adjacent one end for a distance equal to the length of the tank 10, the cover is provided with a raised or offset area 16 to accommodate the flange 11. A suitable packing 17 is interposed between the cover and flange 12 and a similar packing 18 is interposed between the flange 11 and raised or offset area of the cover.

Water or other liquid under pressure is supplied to the tank 10 by way of a supply pipe 19 passing through registering openings 20 in the adjacent end walls of the tanks 5 and 10. Due to the fact that the liquid or water is forced through the pipe 19 under high pressure, the tank 10 is constructed from relatively stout material in comparison to the material forming the tank 5.

To automatically control the supply of water or other liquid from the tank 10 to the tank 5, a float valve is provided embodying a pair of parallel brackets 21 depending from the under face of the tank 10 between which a lever 22 is pivotally supported intermediate its ends, the latter at one end being formed with a pair of divergent arms 23 which project beyond the tank 10. A float 24, which in this instance, is illustrated as being rectangular, is attached to the arms 23 and lever 22 and for this purpose the float is provided with depending ears 25 upon its under face which are pivotally connected with the divergent arms and lever by pivot elements 26.

Vertically, oppositely movable, frusto-conical valve elements 27 formed with depending arms 28 at their lower ends having pivotal connection with the lever upon opposite sides of the brackets 21, as at 29, are movable into engagement with and away from oppositely disposed frusto-conical openings or seats 30 in the bottom of the tank 10. A U-shaped bracket 31 having oppositely extending perforated valve guides or lateral extensions 32 receiving and guiding upstanding stems 33, formed upon the upper ends of the valve elements, is attached to the upper face of the bottom of the tank 10 by removable fastenings 34.

An air vent 35 covered by a reticulated element 36 is provided in the tank 5. With sufficient or normal volume of liquid in the tank 5 the float is elevated and the valves seated to close communication between the tanks 5 and 10. When, however, the liquid supply in the tank 5 recedes below a predetermined point, the pivotal movement of the lever, incident to the descension of the float, raises one valve element from its seat and lowers the other to permit the tank 5 to again fill. As the liquid level in the tank 5 and the float rise, the lever is rocked in the reverse direction and shifts the valves to seated or closed position.

What is claimed is:—

1. In combination a receptacle having a flange at its upper edge, a second receptacle nested therein and also having a flange at its upper edge which rests upon the first mentioned flange, and a cover overlying the upper end of both receptacles.

2. In combination a receptacle having a flange at its upper edge, a second receptacle nested therein and also having a flange at its upper edge which rests upon the first mentioned flange, and a cover overlying the upper end of both receptacles and having a raised area to accommodate the flange of the second receptacle.

3. In a liquid supply tank, a main reservoir having an outlet, a second reservoir mounted therein having communication with a source of liquid supply and provided with a plurality of outlet openings in its bottom, a bracket depending from said bottom, a lever pivoted intermediate its ends to the bracket, vertically movable valves movable towards and away from the openings and having operative connection with the lever, and a float carried by the lever to actuate the valves to open and closed position incident to the rise and fall of the float.

4. In a liquid supply tank, a main reservoir having an outlet, a second reservoir mounted therein having communication with a source of liquid supply and provided with a plurality of outlet openings in its bottom, a bracket depending from said bottom, a lever pivoted intermediate its ends to the bracket, vertically movable valves movable towards and away from the openings and having operative connection with the lever, a float carried by the lever to actuate the valves to open and closed position incident to the rise and fall of the float, and guides for causing the valves to move in a true vertical position.

5. In combination a receptacle having a flange at its upper edge, a second receptacle nested therein and also having a flange at its upper edge which rests upon the first mentioned flange, a cover overlying the upper ends of both receptacles, the second receptacle having an outlet opening, and a valve controlling such outlet opening.

Signed at Portland, in the county of Multnomah and State of Oregon this 19th day of November, A. D. 1927.

WILLIAM S. LOCKE.